United States Patent [19]

Dufour

[11] Patent Number: 5,659,967
[45] Date of Patent: Aug. 26, 1997

[54] LINE LEVEL

[75] Inventor: Jean-Guy Dufour, Quebec, Canada

[73] Assignee: Johnson Level & Tool Mfg. Co., Inc., Mequon, Wis.

[21] Appl. No.: 502,051

[22] Filed: Jul. 14, 1995

[51] Int. Cl.[6] .................................................. G01C 9/28
[52] U.S. Cl. ............................ 33/369; 33/379; 33/1 LE
[58] Field of Search ................................ 33/1 LE, 339, 33/369, 379, 375, 373, 380, 381, 382, 383, 384, 385, 386, 387, 388, 390

[56] References Cited

U.S. PATENT DOCUMENTS

| 839,751 | 12/1906 | Grunewald | 33/369 |
|---|---|---|---|
| 991,446 | 5/1911 | Johnson | 33/369 |
| 1,716,744 | 6/1929 | Stowell | 33/369 |
| 1,785,296 | 12/1930 | Christensen | 33/369 |
| 2,014,709 | 9/1935 | Volz | 33/207 |
| 3,593,428 | 7/1971 | Jacoff | 33/211 |
| 3,878,617 | 4/1975 | West et al. | 33/369 |
| 4,068,386 | 1/1978 | Streeter | 33/369 |
| 5,044,087 | 9/1991 | McAuslin | 33/369 |

FOREIGN PATENT DOCUMENTS 110301  5/1925  Sweden ................................ 33/369

*Primary Examiner*—Thomas B. Will
*Attorney, Agent, or Firm*—Andrus, Sceales, Starke & Sawall

[57] ABSTRACT

A line level comprises a hollow housing having a pair of end portions and a sight opening formed therein. A liquid level indicator has a pair of closed end walls and is observable through the sight opening is slidably received in the housing. A line engaging retainer arrangement is slidable into an interference fit in each of the open end portions of the housing and is engageable with each of the closed end walls of the liquid level indicator for maintaining the position of the liquid level indicator relative to the sight opening in the housing.

24 Claims, 2 Drawing Sheets

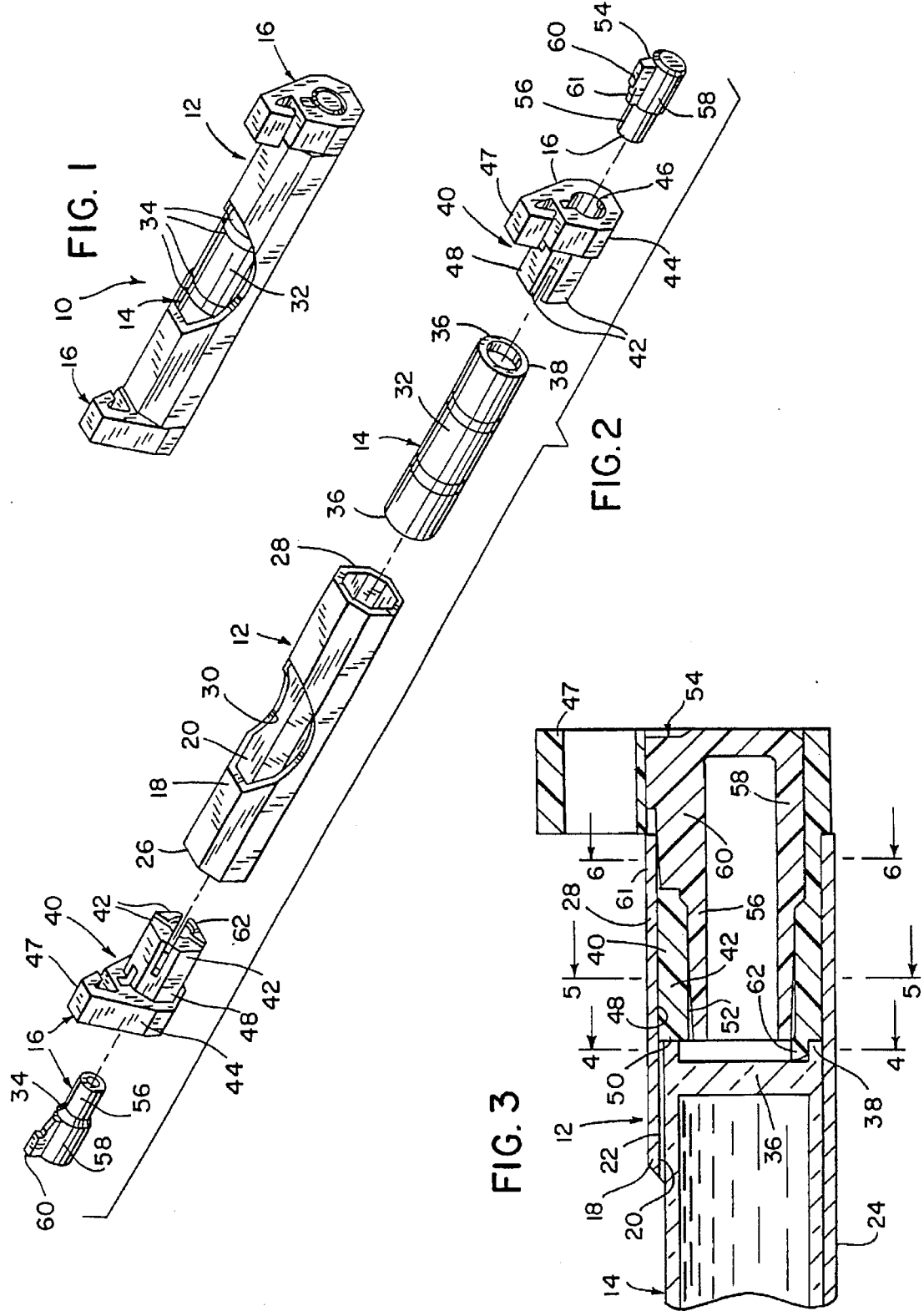

LINE LEVEL

FIELD OF THE INVENTION

This invention relates broadly to line levels wherein a housing includes a liquid level indicator medially thereof and a set of hooks or hangers in opposed orientation at each end of the housing for securement of the housing to a suspension line. More particularly, the invention pertains to improvements in the hook or hanger structure which will ensure firm seating on the bottom of the housing for both the liquid level indicator and the hook to provide precise level alignment with minimum effort.

BACKGROUND OF THE INVENTION

In the manufacture and assembly of levels of the type described above, it is critical that the liquid level indicators such as vials, spirit tubes, and bubble chambers of the levels are precisely aligned relative to a working surface to ensure functional and operating accuracy. In the past, it has been the practice to obtain this accuracy by providing a separate and independent liquid level indicator and subsequently positioning the liquid level indicator in a precise manner within the level. The liquid level indicator has typically been located in an aperture or bore in a housing member of the level utilizing precision equipment and highly skilled labor to assure accurate placement of the liquid level indicator with respect to the work surfaces of the level. Unfortunately, the use of highly skilled labor and the continuing requirement for meticulous alignment of the liquid level indicator contribute greatly to the cost of the end product.

Other attempts at cost reduction have been made in the molding and subsequent machining of the liquid level indicator. However, such operations involve not only the time and expense of skilled labor but are subject to machining error, thereby adding to the cost and possibility of error associated with their production.

Accordingly, it is the general aim of the invention to provide a new and improved line level in a manner as to effectively reduce the labor requirements necessary in its production without compromising its accuracy. It is also desirable to provide an easily assembled line level in a simple, economical manner while obviating the requirements for machining operations which increase the cost and are susceptible to introducing inaccuracies in the finished level.

It is further desirable to provide a new and improved line level in which a liquid level indicator may be precisely mounted without a need for special machinery. It is also within the purview of the invention to provide a liquid level indicator which can be automatically and consistently mounted in the proper position both radially and axially without special tools.

SUMMARY OF THE INVENTION

The present invention advantageously provides an advanced line level which is susceptible of a low cost of manufacture with respect to both materials and labor, and, in turn, is able to be offered at lower prices of sale to the consuming public. The line level features a simple assembly of components which will assure precise alignment of the liquid level indicator with the work surfaces of the level.

In one aspect of the invention, a line level comprises a hollow housing having a pair of open end portions and a sight opening formed therein. A liquid level indicator having a pair of closed end walls is slidably received in the housing and is observable through the sight opening. A line engaging retainer arrangement is slidable into an interference fit in each of the open end portions of the housing and is engageable with each of the closed end walls of the liquid level indicator for maintaining the position of the liquid level indicator relative to the sight opening in the housing.

In yet another aspect of the invention, a line level comprises a hollow, tubular body having an inner wall, an outer wall, a pair of open end portions and a sight opening formed through the inner wall and the outer wall. A closed, liquid level indicator is slidably received in the body and exposed through the sight opening of the body. A line engaging hook assembly is frictionally retained in each of the open end portions of the body. Each of the hook assemblies has a first section engageable with the body and the liquid level indicator and a second section engageable with the body and the first section, the first section and the second section cooperating to maintain the liquid level indicator firmly against the inner wall of the body.

In yet another aspect of the invention, a line level comprises a hollow, cylindrical, tubular body having an upper wall, a lower wall, a pair of open end portions, and a sight opening formed in the upper wall. A cylindrical, liquid level indicator is slidably received in the body and is observable through the sight opening formed in the body. The liquid level indicator has circular, counterbored ends, each defining an outwardly projecting lip. A line engaging hook assembly is frictionally retained in each of the open end portions of the body. Each of the hook assemblies comprises an end cap having a series of horizontally extending fingers joined to a vertically extending hook having a keyhole formed therein. Each of the fingers has an outer surface engageable with the upper wall and the lower wall of the body and an inner surface forming a bore in communication with the keyhole opening. Each of the hook assemblies includes a plug having a forward segment slidable into an interference fit with the inner surfaces of the horizontally extending fingers and a rearward segment slidable into an interference fit in the keyhole opening.

BRIEF DESCRIPTION OF THE DRAWINGS

The invention will become better understood by reference to the following detailed description of the preferred exemplary embodiment when read in conjunction with the appended drawing wherein like numerals denote like elements and:

FIG. 1 is a perspective view of the line level embodying the present invention;

FIG. 2 is an exploded view of the components of the line level shown in FIG. 1;

FIG. 3 is an enlarged, fragmentary cross-sectional view of an end portion of the line level shown in FIG. 1;

DETAILED DESCRIPTION OF THE PREFERRED EMBODIMENT

Figure 4:
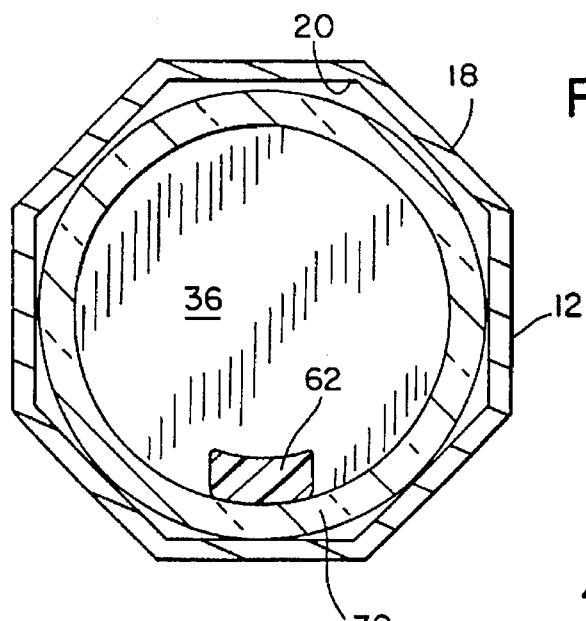
FIG. 4 is an enlarged, cross-sectional view taken on line 4—4 of FIG. 3.

In the drawings and description which follow, a new and improved line level embodying the principles and concepts of the present invention and generally designated by the reference numeral 10 will be described in detail.

Referring to FIGS. 1 and 2, the line level 10 includes a housing 12, a liquid level indicator 14, and a pair of two part hook assemblies 16. Housing 12 is an elongate, hollow, tubular body, selectively extruded from aluminum or any other satisfactory material, having an outer wall 18 which is non-circular in cross-section. As shown, wall 18 is octagonal in cross-section and an inner wall 20 which is correspondingly octagonal in cross-section. The walls 18, 20 include an upper half 22 and a lower half 24 and opposed, open end portions 26, 28. An elongated sight opening 30 is formed medially of the upper half 22 and provides visual access to the usual bubble chamber 32 of liquid level indicator 14 aligned parallel to a longitudinal axis of housing 12.

Liquid level indicator 14 is a conventional bubble vial, consisting of a partially liquid-filled closed cylinder preferably, formed of a transparent plastic material, having a diameter which is less than the diameter of inner wall 20 to enable liquid level indicator 14 to be slidably received in housing 12. The periphery of liquid level indicator 14 is provided with two sets of transversely extending lines 34 spaced equidistantly on opposite sides of the level's center line. These lines advantageously serve as bubble limit lines for the lightweight level. Liquid level indicator 14 is bounded on opposite ends by circular, counterbored ends 36, the continuous surface of each defining an outwardly projecting lip 38.

As a salient feature of the invention, each of the two hook assemblies 16 is frictionally retained in respective end portions 26, 28 of housing 12 and functions as a retainer to prevent the liquid level indicator 14 from moving axially and radially therein, and to maintain the position of the liquid level indicator 14 relative to the sight opening 30.

Figure 5:
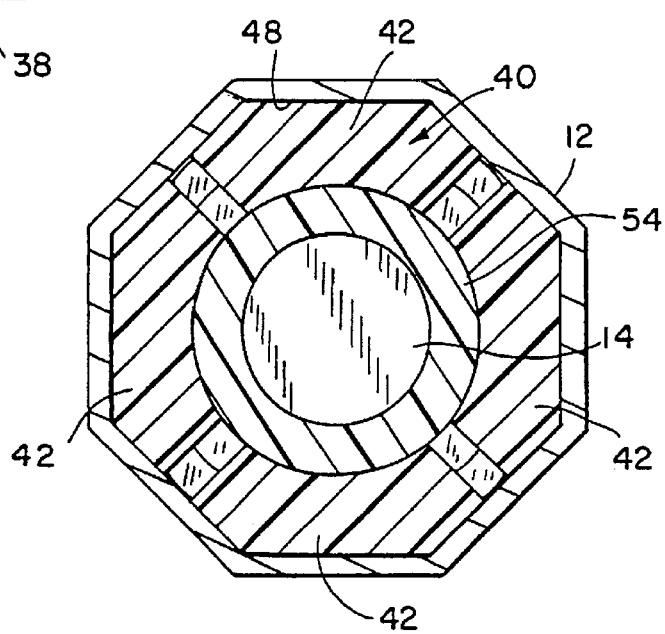
FIG. 5 is an enlarged, cross-sectional view taken on line 5—5 of FIG. 3.
Figure 6:
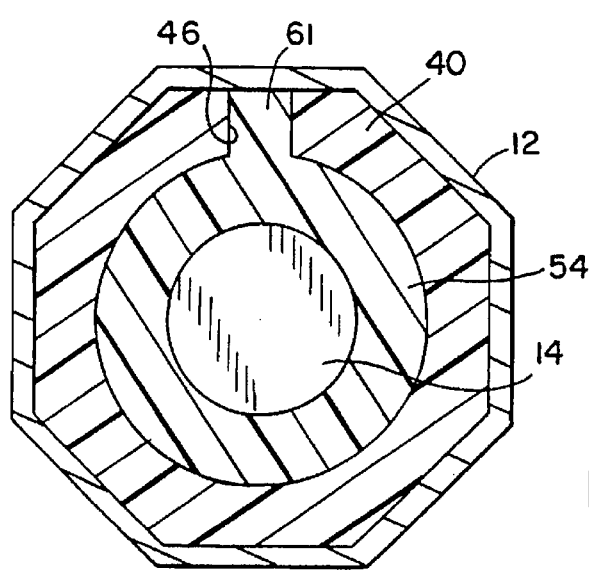
FIG. 6 is an enlarged, cross-sectional view taken on line 6—6 of FIG. 3.

As best seen in FIGS. 3–6, each assembly 16 comprises a first section or end cap 40 having a series of four flexible, horizontally extending fingers 42 slidable into an interference fit in each end portion 26, 28 and joined to a vertically extending hook portion 44 having a keyhole opening 46 formed therethrough. Each hook portion 44 includes an inverted V-shaped hook 47 for engagement with a line (not shown) from which level 10 is suspended. Each of the fingers 42 has an outer surface 48 engageable in an interference fit with the inner wall 20 of housing 12, an end surface 50 abutting closed end 36 of liquid level indicator 14, and an inner surface 52 forming a bore in communication with the keyhole opening 46. Inner surfaces 52 are tapered so as to increase in thickness toward the inner end portion of each finger 42. A second section or plug 54 includes a forward cylindrically shaped segment 56 which has a first predetermined diameter and is slidable into an interference fit with the tapered inner surfaces 52 of the horizontally extending fingers 42. A cylindrically shaped rearward segment 58 having a second predetermined diameter larger than the first predetermined diameter of forward segment 56 is slidable into an interference fit with both the inner wall 20 of housing 12 through engagement tab 61, and with the walls of keyhole opening 46 in hook portion 44. A stepped, locking fin 60 projects upwardly from rearward segment 58 and is frictionally retained in the upper slotted portion of keyhole opening 46. A tapered engagement tab 61 is located forwardly of locking fin 60.

In accordance with the invention, the lowermost finger 42 is provided with an outwardly projecting tab 62 which is engageable in an interference fit with the lip 38 formed on each end of liquid level indicator 14. The purpose of this fit between end cap 40 and liquid level indicator 14 is to maintain a constant downward pressure on the liquid level indicator 14 against the lower half 24 of housing 12. This provides a high degree of accuracy, in the lower half 24 of housing 12 which is consistently used as the gauging portion of level 10, and the relationship between hooks 47 and lower half 24 is constant and fixed, due to the non-circular cross-section of each of these components.

Likewise, the purpose of the interference fit between the flexible fingers 42 of the end cap 40 and the plug 54 is to maintain a constant outward pressure of fingers 42 against the inner wall 20 of housing 12 to frictionally engage end cap 40 with housing 12. This also frictionally engages plug 54 with end cap 40. In addition, the purpose of the interference fit between the housing 12 and the plug 54 is to maintain a constant pressure against the upper half 22 of the inner wall 20 and the end cap 40, forcing the liquid level indicator 14 to sit flush against the lower half 24 of housing 12. The latter interference fit also compensates for any variance in the diameter of the inner wall 20 of housing 12.

By means of the above-described structure, it should be understood that the liquid indicator 14 is prevented from moving axially or radially within housing 12. It will thus be seen that the present invention provides an improved line level which is easy to manufacture, assemble and use without special machinery and without special skill. It can also be appreciated that the present invention eliminates the need for highly skilled labor in the production and assembly of the line level and therefore provides substantial economy of manufacture without sacrificing accuracy. The various interference fits between the components of the level eliminate the need for adhesive, thereby further simplifying the assembly and further reducing the production costs. The flattened area formed by each side of the polygonal outer wall 18 along the lower half 24 provides a flat bottom so that the line level will not roll if set down.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A line level comprising:

hollow housing means having a pair of open end portions and a sight opening formed therein;

a liquid level vial slidably received in said housing means and observable through said sight opening, said liquid level vial having a pair of ends, each of which includes an outwardly projecting lip; and line engaging retainer means slidable into an interference fit in each of said open end portions of said housing means and engaged with a respective one of said ends of said liquid level vial for maintaining the position of the ends of said liquid level vial relative to said sight opening in said housing means, wherein each said retainer means includes lip engagement structure engaged with a respective one of said lips for exerting a transverse force thereon to urge said liquid level vial against said housing means.

2. The line level of claim 1, wherein said housing means has an inner wall which is non-circular in cross-section.

3. The line level of claim 1, wherein said liquid level vial has an outer wall which is substantially circular in cross-section.

4. The line level of claim 1, wherein each said line engaging retainer means has a substantially horizontally extending portion frictionally retained inside one of said end portions of said housing means and a substantially vertically extending portion disposed generally perpendicular to said horizontally extending portion.

5. The line level of claim 4, wherein each said horizontally extending portion has a bore formed therethrough and each said vertically extending portion has a keyhole opening formed therethrough, said bore and said keyhole opening being aligned and in communication with each other.

6. The line level of claim 4, wherein each said vertically extending portion lies outside one of said end portions of said housing means.

7. A line level comprising:
  hollow housing means having a pair of open end portions and a sight opening formed therein;
  liquid level indicating means slidably received in said housing means and observable through said sight opening, said liquid level indicating means having a pair of closed end walls; and
  line engaging retainer means slidable into an interference fit in each of said open end portions of said housing means and engaged with a respective one of said closed end walls of said liquid level indicating means for maintaining the position of said liquid level indicating means relative to said sight opening in said housing means, wherein each said line engaging retainer means has a substantially horizontally extending portion frictionally retained inside one of said end portions of said housing means and a substantially vertically extending portion disposed generally perpendicular to said horizontally extending portion, wherein each said horizontally extending portion has a bore formed therethrough and each said vertically extending portion has a keyhole opening formed therethrough, said bore and said keyhole opening being aligned and in communication with each other;
  wherein each said retainer means includes a plug interference fit in said aligned bore and keyhole opening.

8. A line level comprising:
  a hollow, tubular body having an inner wall, an outer wall, a pair of open end portions, and a sight opening formed through said inner wall and said outer wall;
  a closed liquid level indicator slidably received in said body and exposed through said sight opening of said body; and
  a line engaging hook assembly frictionally retained in each of said open end portions of said body, each of said hook assemblies having a first section engaged with said body and said liquid level indicator and a second section engaged with said body and said first section, said first section and said second sections cooperating to maintain said liquid level indicator firmly against said inner wall of said body.

9. The line level of claim 8, wherein said outer wall is octagonal in cross-section.

10. The line level of claim 8, wherein said liquid level indicator is circular in cross-section.

11. The line level of claim 8, wherein each of said first sections includes an inverted V-shaped hook for retaining a line therein.

12. The line level of claim 8, wherein said liquid level indicator is a substantially cylindrical member having counterbored ends each defining an outwardly projecting lip.

13. The line level of claim 12, wherein each of said first sections includes a tab engaged with a respective one of said lips.

14. The line level of claim 8, wherein each of said first sections comprises an end cap slidable into an interference fit with said inner wall at one of said open end portions and into engagement with said liquid level indicator.

15. The line level of claim 14, wherein each of said second sections comprises a plug slidable into an interference fit with a respective one of said end caps and said body.

16. A line level comprising:
  a hollow, tubular body having an upper section and a lower section, a pair of open end portions, and a sight opening formed in said upper section;
  a cylindrical, liquid level indicator slidably received in said body and observable through said sight opening formed in said body, said liquid level indicator having circular, counterbored ends, each defining an outwardly projecting lip; and
  a line engaging hook assembly frictionally retained in each of said open end portions of said body, each of said hook assemblies comprising an end cap having a series of horizontally extending, flexible fingers joined to a vertically extending hook having a keyhole open formed therein, each of said fingers having an outer surface engageable with said upper section and said lower section of said body and an inner surface forming a bore in communication with said keyhole opening, each of said hook assemblies including a plug having a forward segment slidable into an interference fit with said inner surfaces of said horizontally extending fingers and a rearward segment slidable into an interference fit with said body through said keyhole opening;
  the lowermost of said fingers of each of said end caps being provided with a tab engaged with a respective one of said lips on said liquid level indicator to maintain said liquid level indicator flush against said lower section of said body.

17. The line level of claim 16, wherein said body has an outer wall polygonal in cross-section to define a flat bottom.

18. The line level of claim 16, wherein said body is formed of an aluminum extrusion.

19. The line level of claim 16, wherein each said forward segment is defined by a cylinder having a first predetermined diameter.

20. The line level of claim 19, wherein each said rearward segment is defined by a cylinder having a second predetermined diameter larger than said first predetermined diameter, a stepped fin projecting upwardly into said keyhole opening, and an engagement tab located adjacent said stepped fin engageable with said body.

21. A line level comprising:
  a hollow, tubular body having an inner wall, an outer wall, a pair of open end portions, and a sight opening formed through said inner wall and said outer wall;
  a closed liquid level indicator slidably received in said body and exposed through said sight opening of said body; and
  a line engaging hook assembly frictionally retained in each of said open end portions of said body, each said hook assembly having a first section engaged with said body and said liquid level indicator and a second section engaged with said body and said first section, said first section and said second section cooperating to maintain said liquid level indicator firmly against said inner wall of said body.

22. An assembly for mounting a level vial relative to a body, wherein the body includes a cavity within which the level vial is received, wherein the cavity defines a vial engagement surface and wherein the level vial includes at least a first end having an outwardly projecting lip located adjacent the vial engagement surface, comprising:

a cap member disposed within the cavity and having a portion located adjacent the first end of the level vial, wherein the cap member defines an axially extending passage and includes lip engagement structure overlying the outwardly projecting lip of the level vial; and a plug member engaged within the cap member passage and cooperating with the cap member so as to exert a transverse force on the lip engagement structure for exerting a transverse force on the lip to urge the lip against the vial engagement surface.

23. An assembly for mounting a level vial relative to a body, wherein the body includes a cavity within which the level vial is received, wherein the cavity defines a vial engagement surface and wherein the level vial includes at least a first end having an outwardly projecting lip located adjacent the vial engagement surface, comprising an engagement member disposed within the cavity and located adjacent the first end of the level vial, wherein the engagement member includes lip engagement structure overlying the outwardly projecting lip of the level vial which functions to exert a transverse force on the lip to urge the lip against the vial engagement surface.

24. In a line level including a hollow, tubular body, wherein said body includes at least one open end portion, an inner wall, and a sight opening for providing visual access to the interior of said body, and a closed liquid level indicator slidably received in said body and exposed through said sight opening, the improvement comprising a line engaging hook assembly including a first section frictionally engaged with said body and said liquid level indicator, and a second section engaged with said body and said first section, wherein said first section and said second section cooperate to maintain said liquid level indicator firmly against said inner wall of said body.

* * * * *

UNITED STATES PATENT AND TRADEMARK OFFICE
CERTIFICATE OF CORRECTION

PATENT NO. : 5,659,967
DATED : August 26, 1997
INVENTOR(S) : JEAN-GUY DUFOUR

It is certified that error appears in the above-indentified patent and that said Letters Patent is hereby corrected as shown below:

In The Claims

Claim 16, col. 6, line 19, delete "open" and insert -- opening --.

Signed and Sealed this

Ninth Day of December, 1997

BRUCE LEHMAN

Attest:

Attesting Officer

Commissioner of Patents and Trademarks